United States Patent
Naruse

(10) Patent No.: US 8,351,801 B2
(45) Date of Patent: Jan. 8, 2013

(54) IMAGE FORMING APPARATUS WITH A DETERMINING SECTION THAT MAKES A DETERMINATION WHEN THE APPARATUS TRANSITIONS TO A POWER SAVING MODE OF WHETHER AN IMAGE CAN BE FORMED

(75) Inventor: Kentarou Naruse, Osaka (JP)

(73) Assignee: Kyocera Mita Corporation (JP)

( * ) Notice: Subject to any disclaimer, the term of this patent is extended or adjusted under 35 U.S.C. 154(b) by 226 days.

(21) Appl. No.: 12/755,461

(22) Filed: Apr. 7, 2010

(65) Prior Publication Data

US 2010/0260506 A1    Oct. 14, 2010

(30) Foreign Application Priority Data

Apr. 13, 2009   (JP) .................................. 2009-097367

(51) Int. Cl.
    *G03G 15/00*   (2006.01)
(52) U.S. Cl. .................. 399/9; 399/45; 399/70
(58) Field of Classification Search ............... 399/9, 45, 399/70
    See application file for complete search history.

(56) References Cited

U.S. PATENT DOCUMENTS

| | | |
|---|---|---|
| 2003/0021608 A1 | 1/2003 | Morita et al. |
| 2004/0004732 A1 | 1/2004 | Takeda et al. |
| 2004/0146313 A1* | 7/2004 | Uchizono et al. |
| 2005/0185993 A1* | 8/2005 | Kobayashi |
| 2006/0220297 A1 | 10/2006 | Kusumi |
| 2008/0145087 A1 | 6/2008 | Itou |

FOREIGN PATENT DOCUMENTS

| | | | |
|---|---|---|---|
| JP | 60026941 A | * | 2/1985 |
| JP | 11-277851 | | 10/1999 |
| JP | 11301078 | | 11/1999 |
| JP | 2010130163 | | 6/2010 |

* cited by examiner

*Primary Examiner* — David Gray
*Assistant Examiner* — Laura Roth
(74) *Attorney, Agent, or Firm* — Gerald E. Hespos; Michael J. Porco

(57) ABSTRACT

An image forming apparatus has an image forming station for forming an image and a display unit for displaying specified information. A mode changing section switches a mode of the image forming apparatus between a first mode for waiting on standby with a first power consumption and a second mode for waiting on standby with second power consumption lower, than the first power consumption. A determining section determines whether an image can be formed after the mode is switched from the second mode to the first mode and a starting section starts the display unit when the determining section determines that no image can be formed. A notifying section generates a display on the display unit of information indicating that no image can be formed.

7 Claims, 8 Drawing Sheets

IMAGE FORMING APPARATUS WITH A DETERMINING SECTION THAT MAKES A DETERMINATION WHEN THE APPARATUS TRANSITIONS TO A POWER SAVING MODE OF WHETHER AN IMAGE CAN BE FORMED

BACKGROUND OF THE INVENTION

1. Field of the Invention

The present invention relates to an image forming apparatus and particularly to an image forming apparatus with a function of saving power consumption.

2. Description of the Related Art

Image forming apparatuses of recent years generally include a normal mode and a sleep mode from the perspective of saving power consumption. The normal mode is a mode in which an image can be immediately formed when an image formation request is input and which has high power consumption. On the other hand, the sleep mode is a mode in which an image cannot be immediately formed when an image formation request is input and a preparation time is required until image formation and which has smaller power consumption than the normal mode.

In the case of waiting on standby in the normal mode, the image forming apparatus transitions from the normal mode to the sleep mode to suppress power consumption unless any operation is performed for a specified time. On the other hand, in the case of waiting on standby in the sleep mode, the image forming apparatus forms an image after returning from the sleep mode to the normal mode and preparing for image formation when an image formation request is input.

There is a prior art document which discloses an image forming apparatus including a normal mode and a sleep mode and having a function of saving power consumption. The image forming apparatus of this prior art document starts only functions necessary for an input image formation request when the image formation request is input and the image forming apparatus returns from the sleep mode to the normal mode. Specifically, when FAX data is received, only functions necessary for the output of the FAX data are started without starting a scanner function and the like. In this way, power consumption is saved.

However, in the image forming apparatus of the above prior art document, the functions necessary for the output of the FAX data are started even in such a state where an image cannot be immediately formed due to, for example, a paper-out condition when the image forming apparatus returns from the sleep mode to the normal mode upon receiving the FAX data.

This holds true for other functions such as a copy function and a printer function. In other words, functions necessary for an output corresponding to an input image formation request are started even in such a state where an image cannot be immediately formed when the image forming apparatus returns from the sleep mode to the normal mode upon receiving the image formation request. Then, unnecessary power is consumed to start the functions necessary for the output corresponding to the input image formation request despite the fact that an image cannot be immediately formed.

SUMMARY OF THE INVENTION

An object of the present invention is to provide an image forming apparatus capable of preventing the waste of power.

In order to accomplish this object, one aspect of the present invention is directed to an image forming apparatus including a first mode for waiting on standby with specified power consumption and a second mode for waiting on standby with power consumption lower than the specified power consumption, comprising an image forming station for forming an image while consuming a first power; an operation unit for displaying information of the image forming apparatus and receiving an image formation request to the image forming station while consuming a second power lower than the first power; a transitioning section for transitioning a mode from the first mode to the second mode unless the image formation request is inputted for a specified time; a returning section for returning the mode from the second mode to the first mode if the image formation request is input; a determining section for determining whether or not an image can be formed in the image forming station after the operation of the returning section; a starting section for starting the operation unit when the determining section determines that no image can be formed; and a notifying section for notifying a message to the effect that no image can be formed by means of the operation unit started by the starting section.

Another aspect of the present invention is directed to an image forming apparatus, including an image forming station for forming an image; a display unit for displaying specified information; a mode changing section for switching a mode of the image forming apparatus between a first mode for waiting on standby with first power consumption and a second mode for waiting on standby with second power consumption lower than the first power consumption; a determining section for determining whether or not an image can be formed after the mode is switched from the second mode to the first mode; a starting section for starting the display unit when the determining section determines that no image can be formed; and a notifying section for displaying on the display unit information to the effect that no image can be formed.

These and other objects, features and advantages of the present invention will become more apparent upon reading the following detailed description. Further, advantages of the present invention will become more apparent in the following description with reference to accompanying drawings.

DETAILED DESCRIPTION OF THE PREFERRED EMBODIMENTS

Figure 1:
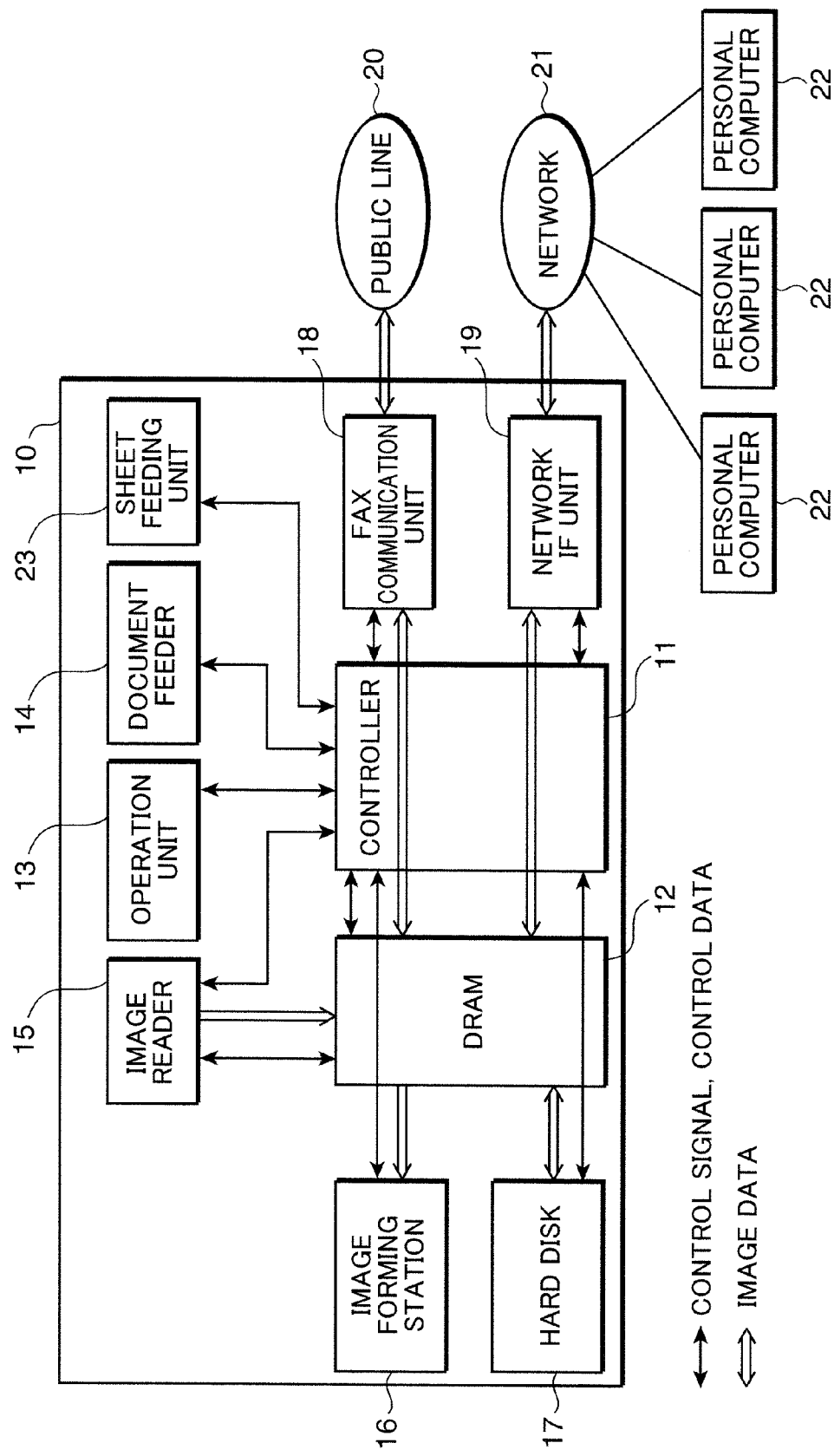
FIG. 1 is a block diagram showing the construction of a digital complex machine according to one embodiment of the invention.

FIG. 1 is a block diagram showing the construction of a digital complex machine 10 according to one embodiment of an image forming apparatus of the present invention. The digital complex machine 10 is provided with a controller 11 for controlling the overall operation of the digital complex machine 10, a DRAM 12 for writing and reading image data and other data, an operation unit 13 as an interface of the digital complex machine 10 with a user, a document feeder 14 for automatically feeding documents to a specified document reading position, an image reader 15 for reading an image of a document fed by the document feeder 14 at the specified reading position using a scanner, an image forming station 16 for forming an image of a document or the like read by the image reader 15 on a sheet, a hard disk 17 for storing image data and other data, a FAX communication unit 18 connected with a public line 20, a network IF (interface) unit 19 used for connection with a network 21, and a sheet feeding unit 23 for feeding sheets for image formation to the image forming station 16.

The controller 11 writes document data supplied from the image reader 15 in the DRAM 12 after compressing and coding it, reads data written in the DRAM 12 and outputs it to the image forming station 16 after expanding and decoding it. In addition to these basic functions, the controller 11 includes functional sections (to be described with reference to FIG. 8) for performing control processings relating to an operation mode switching process of the digital complex machine 10.

The digital complex machine 10 operates as a copier by forming an image in the image forming station 16 via the DARM 12 using image data of a document read by the image reader 15. Further, the digital complex machine 10 operates as a printer by forming an image in the image forming station 16 via the DRAM 12 using image data transmitted from a personal computer 22 connected with the network 21 by way of the network IF unit 19.

Further, the digital complex machine 10 operates as a facsimile machine by forming an image in the image forming station 16 via the DRAM 12 using image data transmitted from the public line 20 via the FAX communication unit 18 and by transmitting image data of a document read by the image reader 15 to the public line 20 via the FAX communication unit 18. In other words, the digital complex machine 10 has a plurality of functions such as a copy function, a printer function and a FAX function relating to image forming processes. Each function includes functions which can be set in more detail.

In FIG. 1, thick-line arrows indicate the flow of image data and thin-line arrows indicate the flow of control signals or control data.

Figure 2:
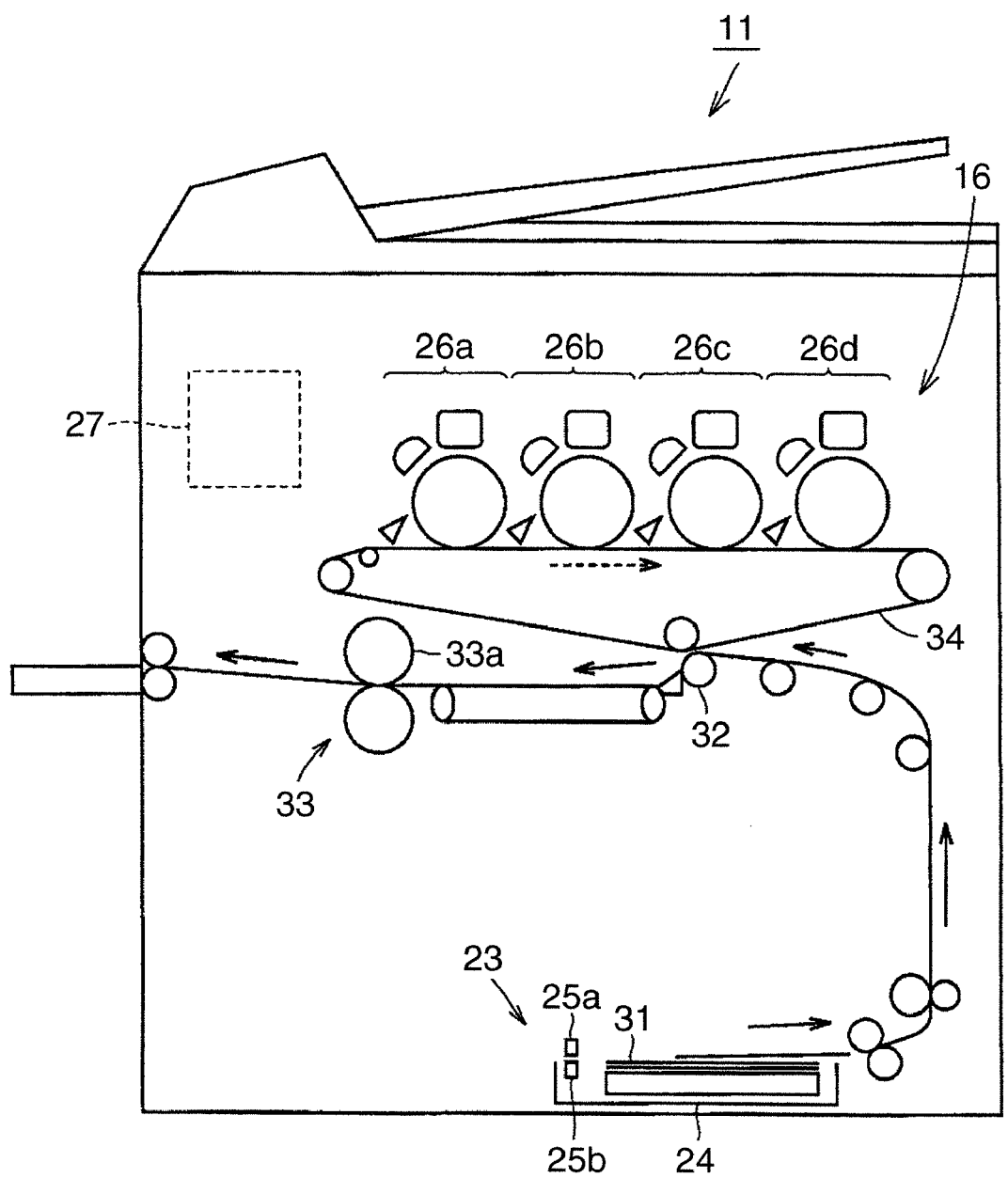
FIG. 2 is a diagram showing exemplary image forming station and sheet feeding unit.

FIG. 2 is a diagram showing examples of the sheet feeding unit 23 and the image forming station 16. In FIG. 2, solid-line arrows indicate the flow of sheets 31 and a dotted-line arrow indicates a rotating direction of a transfer belt 34.

First of all, the sheet feeding unit 23 is described. The sheet feeding unit 23 feeds sheets 31, on which images are to be formed, to the image forming station 16. The sheet feeding unit 23 includes a sheet cassette 24 for storing the sheets 31. The sheet cassette 24 is detachably mountable into a main body of the digital complex machine 10 and withdrawn from the main body by a user for sheet replenishment or another reason. The sheet feeding unit 23 further includes a cassette detection sensor 25a (second sensor) for detecting whether or not the sheet cassette 24 has been withdrawn and a sheet storing part has been opened, and a sheet detection sensor 25b (first sensor) for detecting whether any sheet 31 is stored in the sheet cassette 24.

Next, the image forming station 16 is described. The image forming station 16 forms an image while consuming a first power. In this embodiment, the image forming station 16 includes four photoconductive members and employs a tandem method for forming a color image by forming toner images of the respective colors of yellow, magenta, cyan and black on the four photoconductive members, and transferring the formed toner images onto the transfer belt 34 in a superimposition manner.

The image forming station 16 is provided with toner image forming units 26a to 26d of the respective colors which include the four photoconductive members and form toner images of the respective colors of yellow, magenta, cyan and black, the transfer belt 34 to which the toner images of the respective colors formed by the toner image forming units 26a to 26d are transferred in a superimposition manner, a transfer roller 32 for transferring a full-color toner image transferred to the transfer belt 34 to a sheet 31, a fixing device 33 for fixing the full-color toner image formed on the sheet 31 by the transfer roller 32 to the sheet 31, and an engine 27 for generating a driving force for driving the respective components of the image forming station 16.

Each of the toner image forming units 26a to 26d includes a photoconductive drum on which an electrostatic latent image and a toner image are formed, a charging roller for uniformly charging the circumferential surface of the photoconductive drum, an exposure device for irradiating the circumferential surface of the photoconductive drum with a laser beam to form an electrostatic latent image, a developing device for developing the electrostatic latent image into a toner image by supplying toner to the photoconductive drum, a primary transfer roller for transferring the toner image to the transfer belt 34 and a cleaning blade for cleaning the circumferential surface of the photoconductive drum after the transfer of the toner image.

The fixing device 33 includes a fixing roller 33a for fixing an image to a sheet 31. The fixing roller 33a is internally provided with a heater (not shown). The fixing device 33 sets the fixing roller 33a at a temperature suitable for fixing the toner by heating the heater and, then, causes the sheet having the toners of the respective colors attached thereto to pass the fixing roller 33a. In this way, a full-color toner image transferred to the sheet 31 by the transfer roller 32 is fixed to the sheet 31. As a result, the full-color image is formed on the sheet 31.

The engine 27 includes a motor, gears and the like and controls the driving of the image forming station 16. For example, an aging operation is performed, for example, by driving and rotating the fixing roller 33a and the charging rollers for charging the photoconductive drums upon forming toner images of the respective colors. Of course, the engine 27 drives the photoconductive drums in the toner image forming units 26a to 26d, the developing rollers in the developing devices, the transfer belt 34 and the like at the time of image formation.

Figure 3:
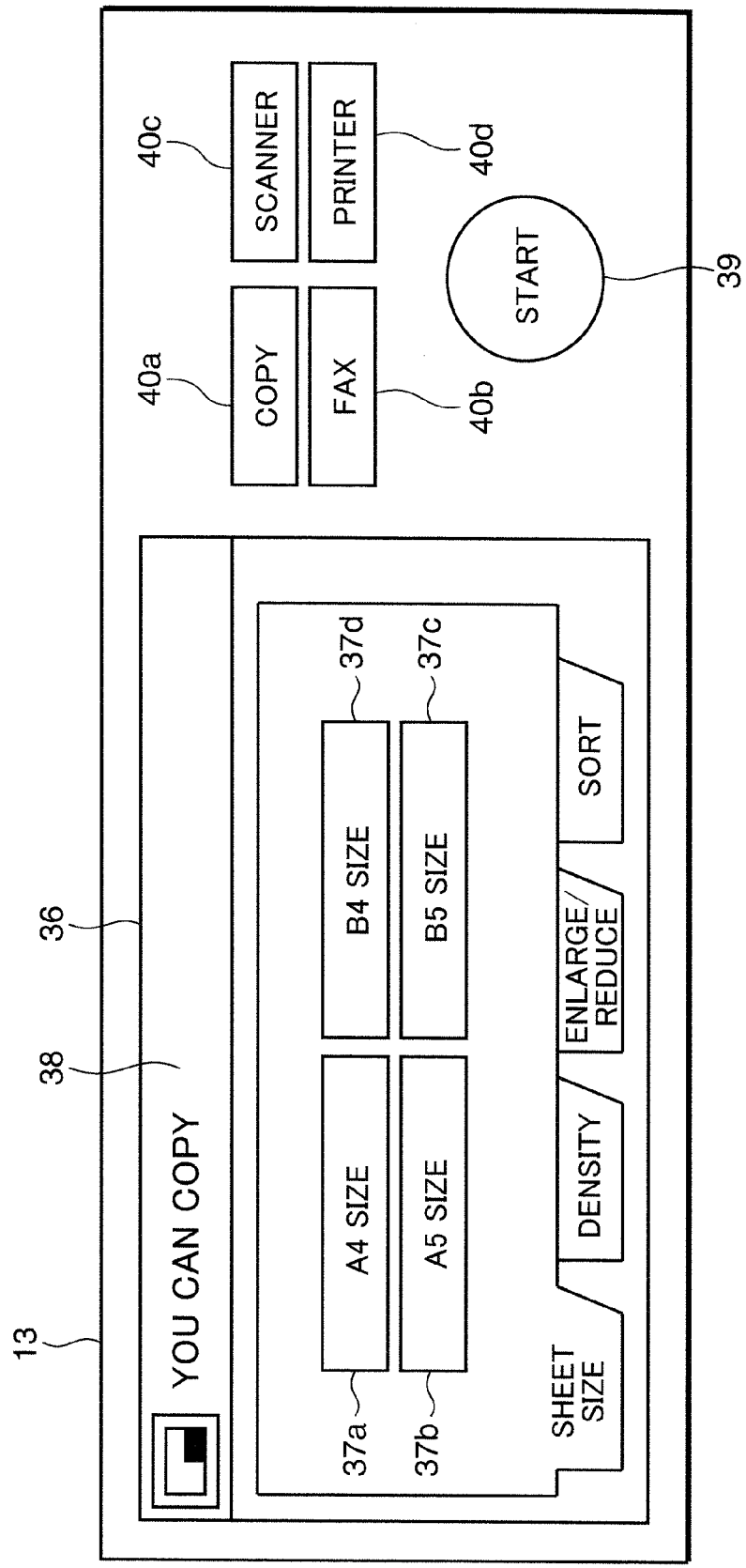
FIG. 3 is a diagram showing an exemplary operation unit.

FIG. 3 is a diagram showing an example of the operation unit 13. The operation unit 13 displays information of the digital complex machine 10 and receives the input of an image formation request to the image forming station 16 while consuming a second power lower than the first power consumed by the image forming station 16. In this embodiment, the operation unit 13 includes a display screen 36 (display unit) in the form of a touch panel and a plurality of buttons.

The display screen 36 includes touch keys 37a to 37d for receiving the selection of a desired condition out of image forming conditions of the digital complex machine 10. The respective touch keys 37a to 37d are pressed down to execute processings assigned thereto. The display screen 36 includes a display column 38 for displaying the state of the digital complex machine 10. The display column 38 displays a message to the effect that an image can be formed such as "YOU CAN COPY", for example, as shown in FIG. 3.

The plurality of buttons include a start button 39 used to input an image formation request, and function selection buttons 40a to 40d used to select a desired function out of the copy function, the printer function, the FAX function and the scanner function of the digital complex machine 10. The plurality of buttons are pressed down to execute processings assigned thereto.

The digital complex machine 10 includes a normal mode (first mode) for waiting on standby with specified power consumption (first power consumption) and a sleep mode (second mode) for waiting on standby with power consumption (second power consumption) lower than the specified power consumption.

The normal mode is a mode in which the digital complex machine 10 can immediately form an image when an image formation request is input from the operation unit 13. In other words, the image forming station 16 is in an operational state. In this case, the power consumption of the digital complex machine 10 during a standby period is high in order to maintain, for example, the temperature of the fixing roller 33a at a temperature suitable for toner fixing.

The sleep mode is a mode in which the digital complex machine 10 cannot immediately form an image even if an image formation request is input from the operation unit 13 and a preparation period is required until the heater is heated to increase the temperature of the fixing roller 33a to the temperature suitable for toner fixing and the like. In other words, the image forming station 16 is in a non-operational state. In this case, the power consumption of the digital complex machine 10 during a standby period is lower than in the normal mode since the temperature of the fixing roller 33a can be kept low.

Figure 8:
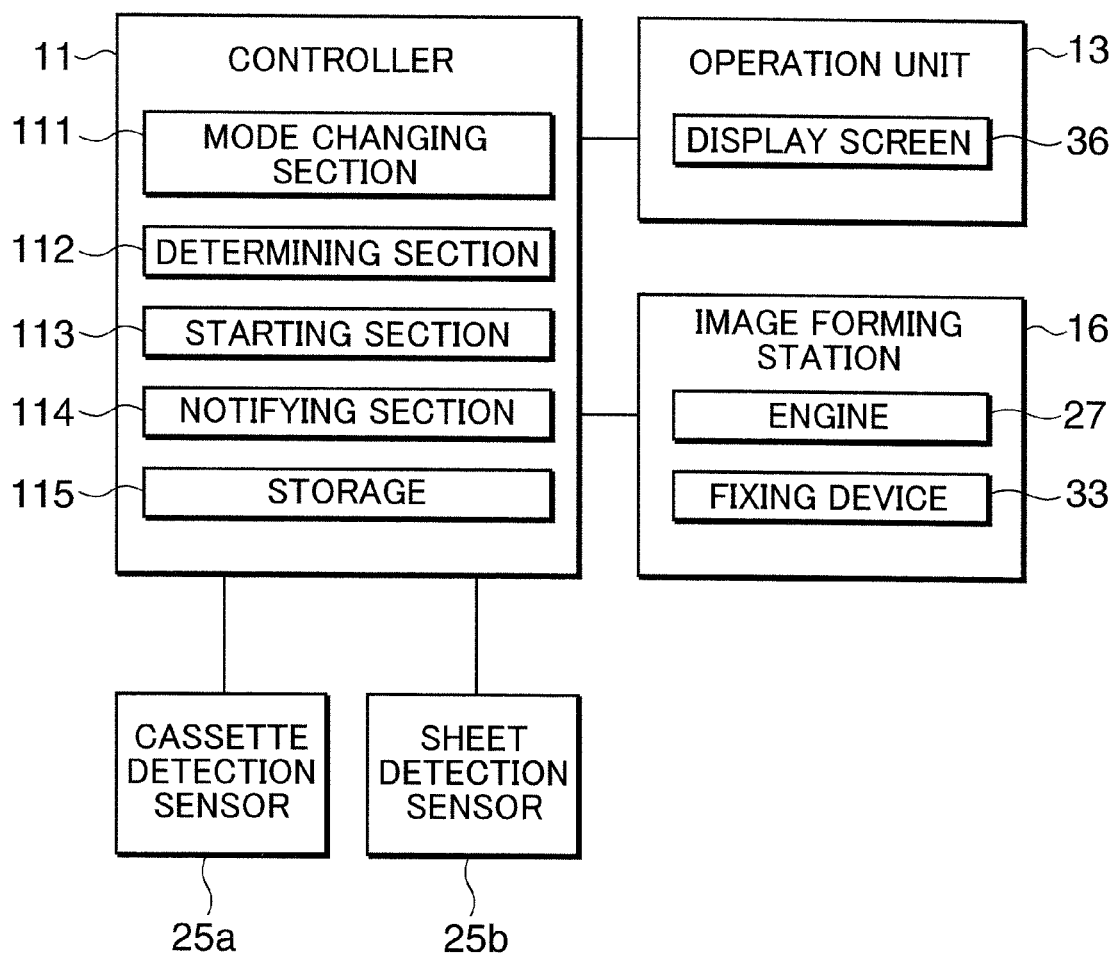
FIG. 8 is a functional block diagram of a controller.

Here, a functional construction of the controller 11 is described with reference to FIG. 8. The controller 11 is composed of a CPU, a ROM storing a control program, a RAM used as a work area of the CPU and the like, and functionally provided with a mode changing section 111, a determining section 112, a starting section 113, a notifying section 114 and a storage 115.

The mode changing section 111 executes a control to switch the operation mode of the digital complex machine 10 between the normal mode and the sleep mode described above. The mode changing section 111 performs a controlling operation of transitioning from the normal mode to the sleep mode (function as a transitioning section) when no image formation request is input for a specified time and a controlling operation of transitioning from the sleep mode to the normal mode (function as a returning section) when an image formation request is input.

Specifically, the mode changing section 111 changes the operation mode from the normal mode to the sleep mode if an image formation request or the like is not given to the operation unit 13 from a user and the digital complex machine 10 does not perform any operation for the specified time while the digital complex machine 10 is waiting on standby in the normal mode. Thus, the power consumption of the digital complex machine 10 is suppressed.

On the other hand, the mode changing section 111 returns the operation mode from the sleep mode to the normal mode upon the input of an image formation request to the operation unit 13 while the digital complex machine 10 is waiting on standby in the sleep mode. Here, the image forming station 16 is started if the digital complex machine 10 is in a state capable of forming an image. In this case, the digital complex machine 10 is in a state to consume relatively high power. Then, power is applied to the heater of the fixing device 33 to heat the heater, and an image forming operation is performed by the image forming station 16 when the temperature of the fixing roller 33a reaches the temperature suitable for toner fixing and the like.

The determining section 112 determines whether or not an image can be formed in the image forming station 16 after the mode changing section 111 executes a control to return the operation mode from the sleep mode to the normal mode. For this determination, the determining section 112 refers to consumed states of consumable supplies used for image formation. Here, the consumable supplies are, for example, sheets and toners used for image formation. For the confirmation of the above consumed states, the determining section 112 refers to detection information of the sheet detection sensor 25b, i.e. detection information as to whether or not any sheet is stored in the sheet cassette 24 (paper-out information) and detection information (toner-out information) of toner remainder sensors (not shown) installed in the developing devices.

The determining section 112 determines that no image can be formed in the image forming station 16 when obtaining the detection information such as the above paper-out information or toner-out information, and stores in the storage 115 information to the effect that no image can be formed due to the lack of sheets, the lack of toner or another cause when the mode changing section 111 changes the operation mode from the normal mode to the sleep mode.

The starting section 113 governs the starting operations of the respective parts of the digital complex machine 10. Specifically, the starting section 113 individually starts and stops the operation unit 13, the image reader 15, the image forming station 16 and the like. To start means here to apply power to electrical elements such as a main circuit, a motor and a heater of the respective parts. The starting section 113 can start the other parts of the image forming station 16 selectively without starting only the engine 27 or can start the other parts selectively without starting only the fixing device 33.

In this embodiment, the starting section 113 executes a control to start the operation unit 13 without starting the image reader 15, the image forming station 16 and the like when the determining section 112 determines such a state that "no image can be formed in the image forming station 16" after the control to return the operation mode from the sleep mode to the normal mode is executed.

The notifying section 114 executes a control to display various pieces of information of the digital complex machine 10 on the display screen 36 (display unit) of the operation unit 13. In this embodiment, when the starting section 113 starts only the operation unit 13 at the time of return to the normal mode, a control is executed to cause the display screen 36 of the started operation unit 13 to notify a message to the effect that no image can be formed.

The storage 115 stores a determination result by the determining section 112 as to whether or not an image can be formed. As shown in FIG. 8, the storage 115 may use a storage area in the controller 11 or may use a storage area of the DRAM 12 or the hard disk 17.

Figure 4:
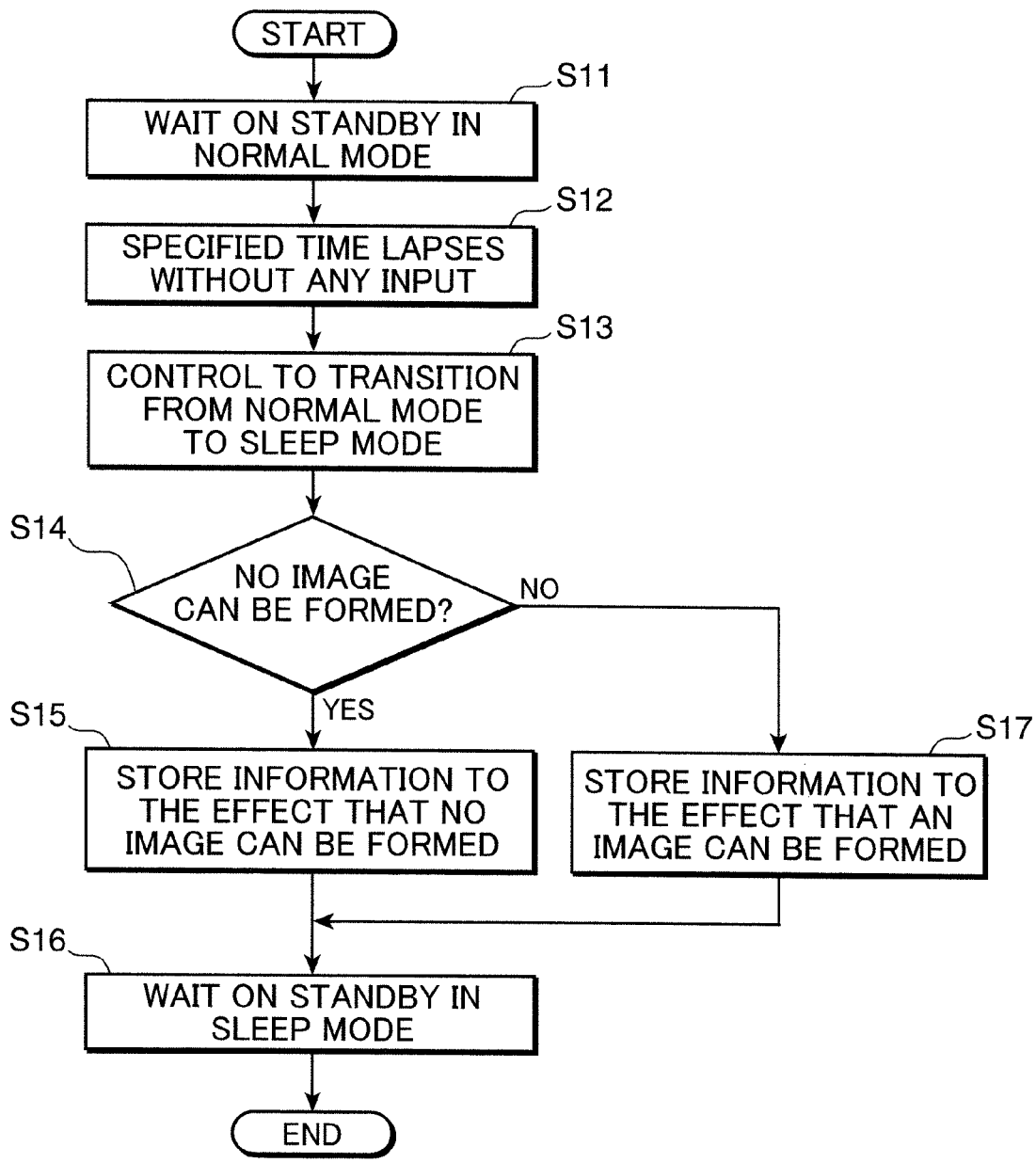
FIG. 4 is a flow chart showing an operation in the case of transitioning from a normal mode to a sleep mode.

Next, exemplary processes performed by the controller 11 are described with reference to flow charts. FIG. 4 is a flow chart showing a process performed when the digital complex machine 10 transitions from the normal mode to the sleep mode.

The controller 11 causes the digital complex machine 10 to wait on standby in the normal mode (Step S11 in FIG. 4, Step is omitted below). The mode changing section 111 starts time measurement by an unillustrated timer after the digital complex machine 10 performed the last operation. A specified time lapses (S12) without an image formation request being input from the operation unit 13, i.e. without any operation being performed by the digital complex machine 10.

Then, the mode changing section 111 executes a control to transition the operation mode of the digital complex machine 10 from the normal mode to the sleep mode (S13). At this time, the determining section 112 determines whether or not the image forming station 16 is in such a state as to be able to form an image after the return from the sleep mode to the normal mode.

Specifically, the determining section 112 determines whether or not any sheet is stored in the sheet cassette 24 by means of the sheet detection sensor 25*b*. If no sheet is stored in the sheet cassette 24, the determining section 112 determines that no image can be formed (YES in S14). In this case, the determining section 112 stores information to the effect that no image can be formed, i.e. paper-out information in the storage 115 (S15). Thereafter, the mode changing section 111 causes the digital complex machine 10 to wait on standby in the sleep mode until the operation unit 13 receives the input of an image formation request (S16).

Figure 5:
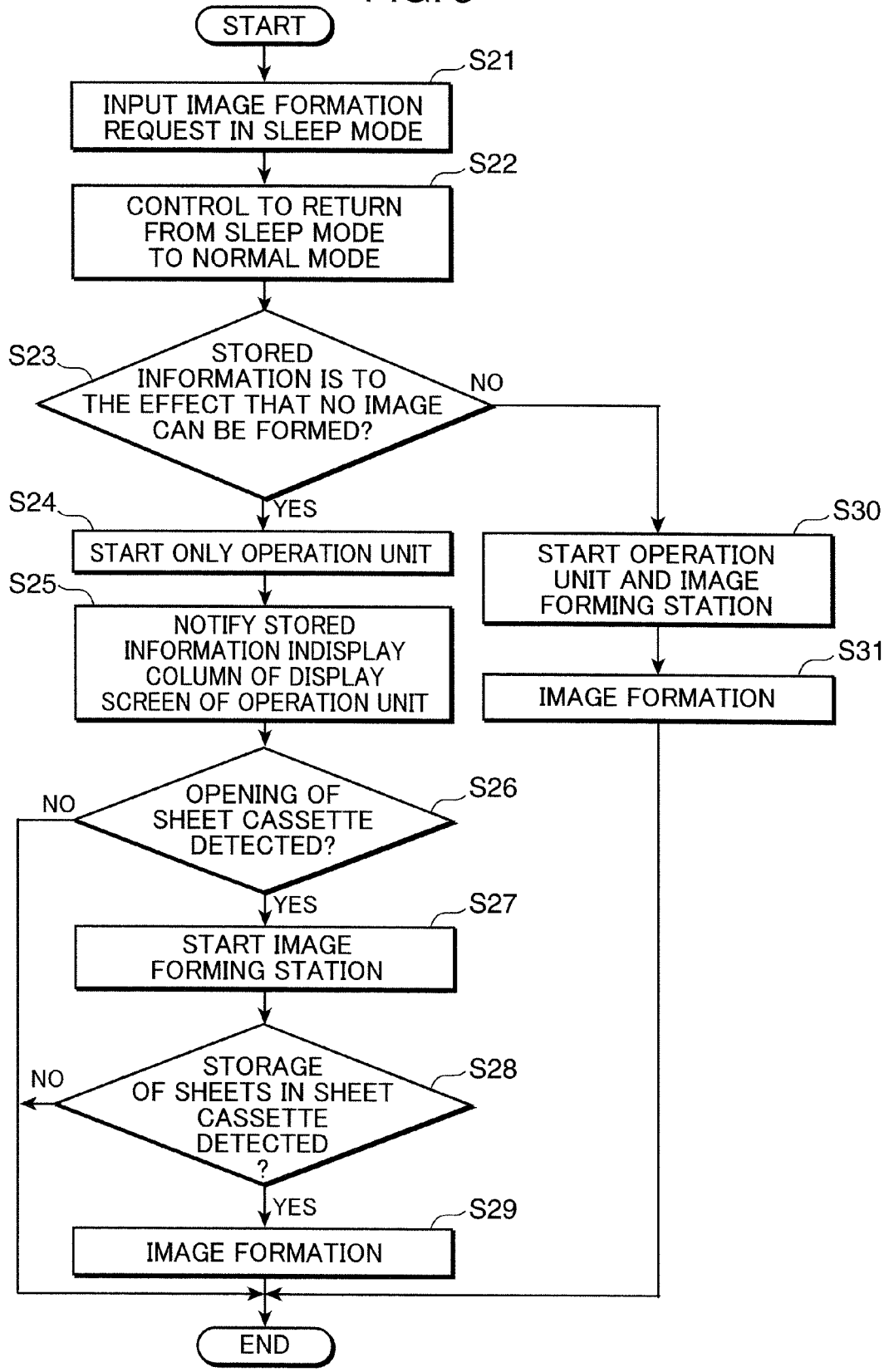
FIG. 5 is a flow chart showing an operation in the case of returning from the sleep mode to the normal mode after transitioning to the sleep mode in FIG. 4.

FIG. 5 is a flow chart showing a process in the case of returning from the sleep mode to the normal mode after the transition to the sleep mode in FIG. 4. This process is started when a user inputs an image formation request in the operation unit 13 of the digital complex machine 10 waiting on standby in the sleep mode (S21). The input of the image formation request means, for example, that the start button 39 of the operation unit 13 is pressed down to utilize the copy function.

Then, the mode changing section 111 executes a control to return the operation mode of the digital complex machine 10 from the sleep mode to the normal mode (S22). At this time, the determining section 112 refers to the information stored in the storage 115 in S15. Here, since the referred information is the paper-out information, the determining section 112 determines that no image can be formed (YED in S23) and, in this case, the starting section 113 starts only the operation unit 13 (S24). Specifically, only the display screen 36 of the operation unit 13 is started without starting the fixing device 33 and the engine 27 of the image forming station 16, the image reader 15 and the like. In other words, the display screen 36 in the form of a touch panel is in an active state.

Figure 6:
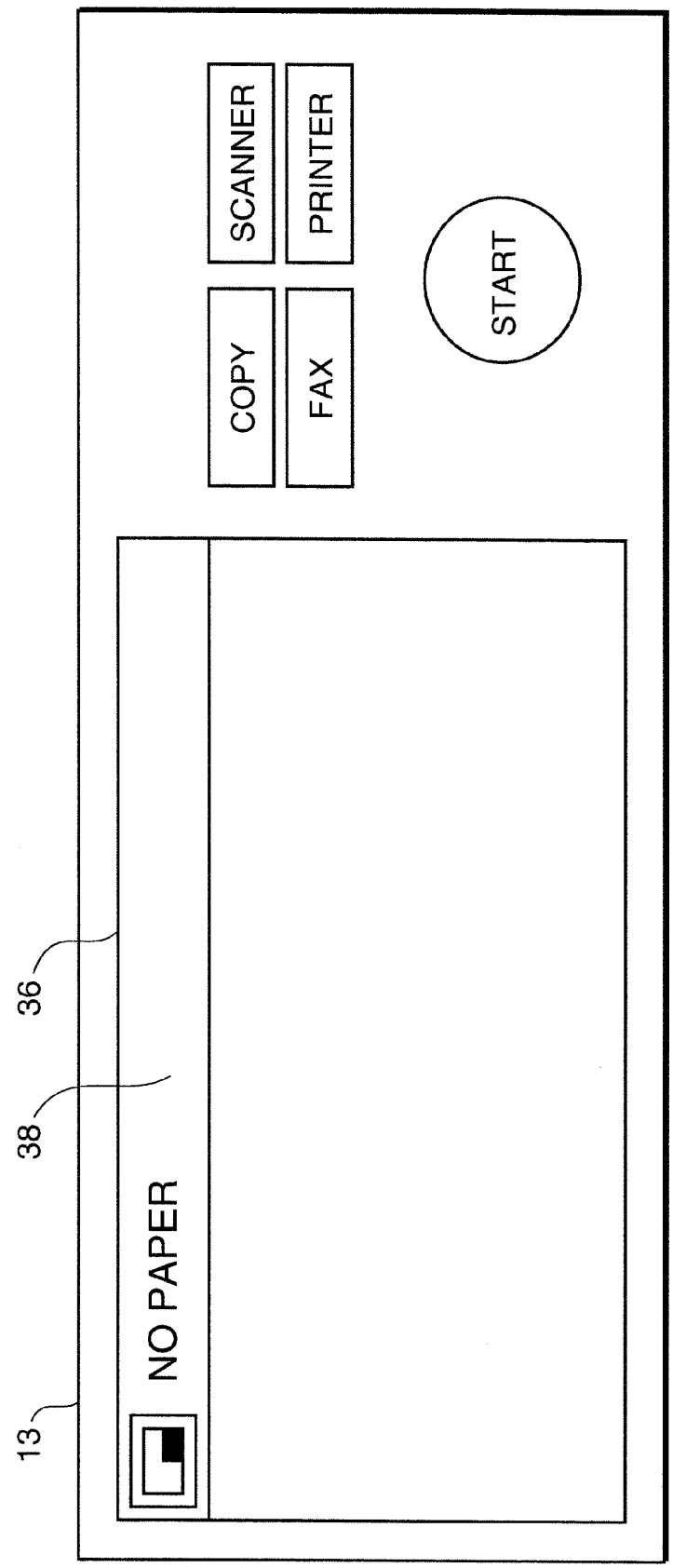
FIG. 6 is a diagram showing an exemplary case in which paper-out information is display in a display column of a display screen of the operation unit.

Thereafter, the notifying section 114 notifies the stored information in the display column 38 of the display screen 36 of the operation unit 13 (S25). In other words, the paper-out information is displayed. FIG. 6 is a diagram showing an exemplary case in which paper-out information is display in the display column 38 of the display screen 36 of the operation unit 13.

Upon the lapse of a specified time after the paper-out information is notified, the starting section 113 starts the image forming station 16. Specifically, upon detecting that the sheet cassette 24 was withdrawn and opened by means of the cassette detection sensor 25*a* (YES in S26), the starting section 113 starts the image forming station 16 (S27). In other words, the starting section 113 executes a control to start heating the heater of the fixing device 33 by applying power thereto and increase the temperature of the fixing roller 33*a* to the temperature suitable for toner fixing and the like.

This is because it is supposed from the withdrawal of the sheet cassette 24 that the user thereafter replenishes the sheet cassette 24 with sheets to set a state where an image can be formed. Accordingly, a control is executed to heat the fixing roller 33*a* beforehand and start an image forming operation at a timing when the sheet cassette 24 is mounted into the main body of the digital complex machine 10. When the storage of sheets in the sheet cassette 24 is detected by the sheet detection sensor 25*b* (YES in S28), the controller 11 causes the image forming station 16 to perform an image forming operation (S29).

In this way, the controller 111 starts the operation unit 13 that consumes the low power (second power) if determining that no image can be formed after the return from the sleep mode with the low power consumption to the normal mode with the high power consumption. Then, the information to the effect that no image can be formed is notified on the display screen 36 of the operation unit 13. Thus, it can be prevented to start the image forming station 16 that consumes the high power (first power) when no image can be formed after the return to the normal mode. As a result, unnecessary power is not consumed, wherefore the waste of power can be efficiently prevented. Further, by notifying in the operation unit 13 the message to the effect that no image can be formed, it is possible to urge the user to solve the state where no image can be formed.

Since sheets are replenished by the user while the image forming station is started in S27, a time up to the image formation can be shortened.

If determining that an image can be formed in S14 (NO in S14), the determining section 112 stores in the storage 115 information to the effect that an image can be formed (S17). In other words, information to the effect that sheets are stored in the sheet cassette 24 is stored. Then, since the information stored in the storage 115 is paper-in information, the determining section 112 determines in S23 that an image can be formed (NO in S23). In response to this, the starting section 113 starts the operation unit 13 and the image forming station 16 (S30). Thereafter, the image forming station 16 performs an image forming operation (S31).

If the opening of the sheet cassette 24 is not detected by the cassette detection sensor 25*a* in S26 (NO in S26), the starting section 113 does not start the image forming station 16.

The controller 11 executes such a control as not to perform the image forming operation if the opening of the sheet cassette 24 is detected by the cassette detection sensor 25*a* (YES in S26) and if the storage of sheets is not detected by the sheet detection sensor 25*b* (NO in S28).

This embodiment is basically described above. The following construction and controls may be adopted instead of the above construction and controls.

If the cassette detection sensor 25*a* detects the opening of the sheet cassette 24, but the sheet detection sensor 25*b* does not detect the storage of sheets in the sheet cassette 24 in S26 to S29, a control may be executed not to perform the image forming operation and transition to the sleep mode again. In other words, if it is determined that the cause of being unable to form an image has not been solved yet, the control may be executed to transition to the sleep mode again.

The sheet feeding unit 23 may be so constructed as to store a plurality of sizes of sheets. In this case, for example, the lack of sheets of A4 size and the presence of sheets of A3 size are stored in S15. When an image formation request is input to the operation unit 13 to form an image on a sheet of A4 size in S21, the notifying section 114 displays on the display screen 36 a message to the effect that sheets of A4 size are absent, but sheets of A3 size are present.

Here, a message inquiring whether or not an image is to be formed on a sheet of A3 size may be further displayed on the display screen 36. In other words, an output on an alternative sheet may be selected. In the case of selecting the output on the alternative sheet, the starting section 113 starts the image forming station 16 to form an image on the alternative sheet.

In the case of selecting no output on the alternative sheet, it is waited until sheets of A4 size are stored in the sheet cassette 24. When the sheet detection sensor 25b detects the storage of sheets, the image forming station 16 forms an image on a sheet of A4 size.

Figure 7:
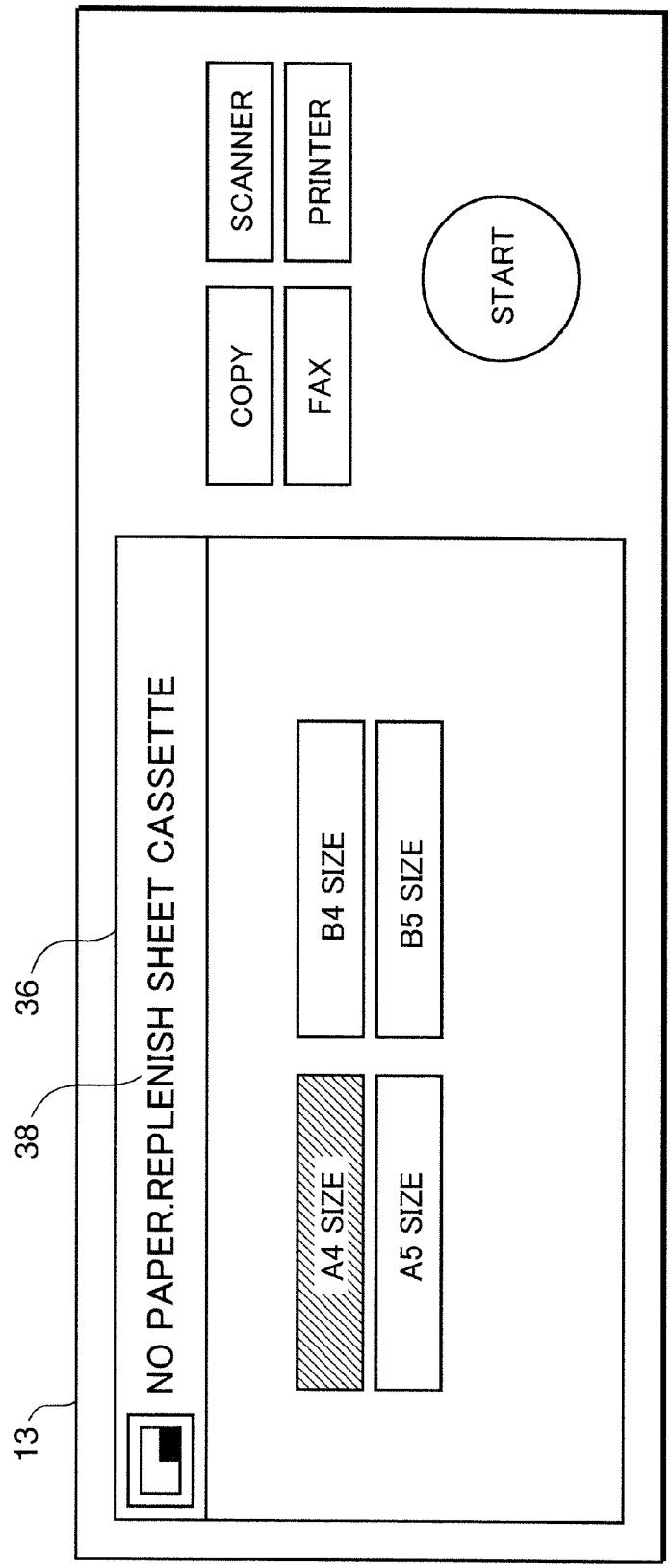
FIG. 7 is a diagram showing an exemplary case in which information urging the replenishment of sheets in a sheet cassette is displayed in the display column of the display screen of the operation unit.

Although the paper-out information is displayed on the display screen 36 in S25 in the above embodiment, a control may be executed to display information for solving the paper-out condition in response to the paper-out information without being limited to the above. In other words, the notifying section 114 may be caused to execute such a control as to display information for solving the cause of being unable to form an image. For example, as shown in FIG. 7, a message is displayed in the display column 38 of the display screen 36 of the operation unit 13 to urge the replenishment of sheets in the sheet cassette 24. In the presence of a plurality of sizes of sheets, it may be indicated which size of sheets may be replenished. In FIG. 7, it is indicated to replenish sheets of A4 size.

In the above embodiment, the storage of sheets in the sheet cassette 24 is determined and the paper-out information is stored in S15 when the determining section 112 determines whether or not an image can be formed. Without being limited to this, the determining section 112 may determine whether or not an image can be formed depending on the consumed states of the consumable supplies used for image formation in the digital complex machine 10. For example, the determining section 112 may determine whether or not there still remains any toner used for image formation in the image forming station 16 and store the toner-out information in the storage 115 or may determine the presence of sheets and toner and store the paper-out information and the toner-out information. Further, other consumable supplies may be determined and their determination results may be stored.

In the above embodiment, the operation unit 13 includes a plurality of buttons and the display screen 36 for displaying the information of the digital complex machine 10 and this display screen 36 functions as the display unit. Without being limited to this, only the display screen 36 may be disposed at a position other than in the operation unit 13.

In the above embodiment, the message to the effect that no image can be formed is displayed on the display screen 36 in S25. Without being limited to this, the operation unit 13 may include a sound output unit for outputting sound, and the notifying section 114 may cause the sound output unit to notify information by sound. Further, the operation unit 13 may include an LED and give notification by turning the LED on and off. Another method may be adopted for notification.

In the above embodiment, the determining section 112 determines whether or not an image can be formed after the return to the normal mode and causes the storage 115 to store the determination result in S15 when the mode changing section 111 executes a control to transition from the normal mode to the sleep mode. Without being limited to this, the determining section 112 may determine whether or not an image can be formed at specified time intervals and the determination result may be renewably stored in S16 while the digital complex machine 10 is waiting on standby in the sleep mode. Specifically, the determining section 112 determines whether or not any sheet is stored in the sheet cassette 24 at the specified time intervals, whereby the information stored in the storage 115 may be renewed.

In the above embodiment, the determining section 112 refers to the information stored in the storage 115 in S13 to S15. Without being limited to this, the determining section 112 may determine whether or not an image can be formed before the return from the sleep mode to the normal mode and the start of the image forming station 16. If the determining section 112 determines that no image can be formed, the starting section 113 may execute a control to start the operation unit 13. In other words, a determination may be made at the time of return from the sleep mode to the normal mode without using the storage 115.

In the above embodiment, the operation unit 13 is started in S24. Without being limited to this, another part may be started if this part consumes a low power. For example, the starting section 113 may execute a control to start all the parts of the image forming station 16 other than the fixing device 33 or the engine 27.

In the above embodiment, the image forming station 16 is started if the cassette detection sensor 25a detects the opening of the sheet cassette 24 in S26 to S29. Without being limited to this, the starting section 113 may start the image forming station 16 assuming that the sheet cassette 24 was replenished with sheets upon the lapse of a specified time following the notification of the paper-out information even if the opening of the sheet cassette 24 is not detected. This enables the image forming station 16 to be started, for example, even if the user prepares sheets at a place distant from the digital complex machine 10 without operating the sheet cassette 24. An image can be immediately formed upon the preparation of sheets. In this case, the cassette detection sensor 25a may be omitted.

Although the image forming station 16 is of the tandem type including the four photoconductive members in the above embodiment, it may be of the type including one photoconductive member without being limited to the above.

The embodiment of this invention is described above with reference to the drawings, but this invention is not limited to the illustrated embodiment. The illustrated embodiment can be altered and modified in various ways within the same scope as this invention or within the scope of equivalents.

The above specific embodiment mainly includes inventions having the following constructions.

An image forming apparatus according to one aspect of the present invention is an image forming apparatus including a first mode for waiting on standby with specified power consumption and a second mode for waiting on standby with power consumption lower than the specified power consumption and comprising an image forming station for forming an image while consuming a first power; an operation unit for displaying information of the image forming apparatus and receiving an image formation request to the image forming station while consuming a second power lower than the first power; a transitioning section for transitioning a mode from the first mode to the second mode unless the image formation request is inputted for a specified time; a returning section for returning the mode from the second mode to the first mode if the image formation request is input; a determining section for determining whether or not an image can be formed in the image forming station after the operation of the returning section; a starting section for starting the operation unit when the determining section determines that no image can be formed; and a notifying section for notifying a message to the effect that no image can be formed by means of the operation unit started by the starting section.

According to this construction, if it is determined that no image can be formed after the return from the second mode to the first mode, the operation unit that consumes the low power is started after the return. In the operation unit, the message to the effect that no image can be formed is notified. Thus, if no image can be formed after the return from the second mode to the first mode, it can be prevented to start the image forming station that consumes the high power. As a result, unnecessary power is not consumed, wherefore the waste of power can be efficiently prevented. Further, by notifying in the operation unit the message to the effect that no image can be formed, a user can be urged to solve a state where no image can be formed.

In the above construction, it is preferable that the operation unit includes a display unit for displaying the information of the image forming apparatus; and that the notifying section causes the display unit to display the message to the effect that no image can be formed. According to this construction, suitable notification can be made using the display unit of the operation unit.

In the above construction, it is preferable that a storage for storing data is further provided; that the determining section further determines whether or not an image can be formed when the transitioning section operates; and that the storage stores a result of the determination. According to this construction, a suitable control can be executed based on a state of the image forming apparatus upon the transition from the first mode to the second mode.

In the above construction, it is preferable that the image forming station is in a startable state in the first mode while being in an unstartable state in the second mode; and that the determining section determines whether or not an image can be formed before the returning section operates and the image forming station is started. According to this construction, the determining section makes a specified determination before the image forming station that consumes the high power in the image forming apparatus is started, wherefore a power consumption suppressing effect can be increased.

In the above construction, it is preferable that a storage for storing data is further provided; that the image forming station is in a startable state in the first mode while being in an unstartable state in the second mode; that the determining section makes a first determination as to whether or not an image can be formed when the transitioning section operates and a second determination as to whether an image can be formed before the returning section operates and the image forming station is started; and that the storage stores a result of the first determination.

In the above construction, the determining section preferably determines whether or not an image can be formed based on a consumed state of a consumable supply used for image formation. According to this construction, since a determination in the context of an actual situation, i.e. the consumed state of the consumable supply is made, whether or not an image can be formed can be reliably determined.

In the above construction, it is preferable that a sheet cassette for storing sheets to be supplied to the image forming station and a first sensor for detecting whether or not any sheet is stored in the sheet cassette are further provided; and that the determining section determines that no image can be formed when the first sensor detects that no sheet is stored in the sheet cassette. According to this construction, whether or not an image can be formed can be reliably determined based on the presence or absence of sheets in the sheet cassette.

In this case, it is preferable that a second sensor for detecting whether or not the sheet cassette is withdrawn from a main body of the image forming apparatus is further provided; and that the starting section can start the image forming station and starts the image forming station if the second sensor detects that the sheet cassette is withdrawn from the main body after the first sensor detects that no sheet is stored in the sheet cassette. According to this construction, an image forming operation can be quickly performed after the replenishment of sheets since the image forming station is started, presuming the replenishment of sheets after the sheet cassette is withdrawn.

In the above construction, it is preferable that the image forming station forms an image on a sheet by attaching toner to the sheet and includes a fixing device for fixing the toner attached to the sheet; and the starting section has a function of starting the image forming station in the first mode and a function of selectively not starting the fixing device of the image forming station.

Alternatively, the image forming station may include an engine for generating a driving force and the starting section may have a function of starting the image forming station in the first mode and a function of selectively not starting the engine of the image forming station.

According to these constructions, since the starting of the fixing device or the engine of the image forming station that consumes particularly high power can be individually controlled, a starting control can be simplified while the power consumption is suppressed.

In the above construction, the starting section preferably has a function of starting the image forming station in the first mode and starts the image forming station upon the lapse of a specified time after the operation of the notifying section. According to this construction, the image forming station can be quickly started.

An image forming apparatus according to another aspect of the present invention includes an image forming station for forming an image; a display unit for displaying specified information; a mode changing section for switching a mode of the image forming apparatus between a first mode for waiting on standby with first power consumption and a second mode for waiting on standby with second power consumption lower than the first power consumption; a determining section for determining whether or not an image can be formed after the mode is switched from the second mode to the first mode; a starting section for starting the display unit when the determining section determines that no image can be formed; and a notifying section for displaying on the display unit information to the effect that no image can be formed.

According to this construction, it can be prevented to start the image forming station that consumes high power if no image can be formed after the return from the second mode to the first mode. As a result, unnecessary power is not consumed, wherefore the waste of power can be efficiently prevented.

This application is based on Japanese Patent Application Serial No. 2009-097367, filed in Japan Patent Office on Apr. 13, 2009, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. An image forming apparatus including a first mode for waiting on standby with specified power consumption and a second mode for waiting on standby with power consumption lower than the specified power consumption, comprising:
an image forming station for forming an image while consuming a first power;
an operation unit for displaying information of the image forming apparatus and receiving an image formation request to the image forming station while consuming a second power lower than the first power;

a transitioning section for transitioning a mode from the first mode to the second mode unless the image formation request is inputted for a specified time;

a returning section for returning the mode from the second mode to the first mode if the image formation request is input;

a determining section for determining whether or not an image can be formed in the image forming station after the operation of the returning section;

a starting section for starting the operation unit when the determining section determines that no image can be formed; and a notifying section for notifying a message to the effect that no image can be formed by means of the operation unit started by the starting section, wherein the starting section has a function of starting the image forming station in the first mode and starts the image forming station upon the lapse of a specified time after the operation of the notifying section.

2. An image forming apparatus according to claim 1, wherein:

the operation unit includes a display unit for displaying the information of the image forming apparatus; and the notifying section causes the display unit to display the message to the effect that no image can be formed.

3. An image forming apparatus according to claim 1, wherein:

the image forming station is in a startable state in the first mode while being an unstartable state in the second mode; and the determining section determines whether or not an image can be formed before the returning section operates and the image forming station is started.

4. An image forming apparatus according to claim 1, further comprising a storage for storing data, wherein:

the image forming station is in a startable state in the first mode while being in an unstartable state in the second mode;

the determining section makes a first determination as to whether or not an image can be formed when the transitioning section operates and a second determination as to whether an image can be formed before the returning section operates and the image forming station is started; and the storage stores a result of the first determination.

5. An image forming apparatus according to claim 1, wherein the determining section determines whether or not an image can be formed based on a consumed state of a consumable supply used for image formation.

6. An image forming apparatus according to claim 5, further comprising:

a sheet cassette for storing sheets to be supplied to the image forming station; and a first sensor for detecting whether or not any sheet is stored in the sheet cassette, wherein the determining section determines that no image can be formed when the first sensor detects that no sheet is stored in the sheet cassette.

7. An image forming apparatus according to claim 6, wherein:

the sheet cassette is withdrawable from a main body of the image forming apparatus;

the image forming apparatus further comprises a second sensor for detecting whether or not the sheet cassette is withdrawn from the main body; and the starting section can start the image forming station and starts the image forming station if the second sensor detects that the sheet cassette is withdrawn from the main body after the first sensor detects that no sheet is stored in the sheet cassette.

* * * * *